United States Patent Office 3,386,951
Patented June 4, 1968

3,386,951
MICROBICIDAL AGENTS FOR PAINT AND SYNTHETIC RESIN COATINGS
Otto Pauli, Krefeld, Engelbert Kuhle, Bergisch-Gladbach, and Erich Klauke, Cologne-Flittard, Germany, assignors to Farbenfabriken Bayer Aktiengesellschaft, Leverkusen, Germany, a German corporation
No Drawing. Filed Mar. 15, 1965, Ser. No. 439,970
Claims priority, application Germany, Apr. 11, 1964,
F 42,596
4 Claims. (Cl. 260—45.9)

ABSTRACT OF THE DISCLOSURE

Stable coating compositions having resistance to mold and bacteria, said compositions having incorporated therein about .5–2% by weight of a particular active compound. More specifically the present invention relates to microbicidal agents for paint.

---

The present invention relates to microbicidal agents for paint and synthetic resin coatings; more particularly it concerns sulphamides of the formula

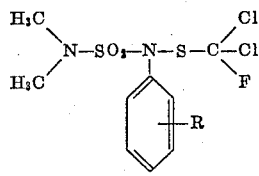

in which R stands for hydrogen, methyl or chlorine and their use as microbicidal agents for paint and synthetic resin coatings.

In order to apply the sulphamides of the above formula as microbicidal agents for paint and synthetic resin coatings it is advantageous to proceed in such a manner that the sulphamides are incorporated in a quantity of about 0.5 to 2 percent by weight, referred to the total solids content of the coatings, together with the pigments, in binding agents of any type, for example in paint dispersions, air-drying oil lacquers or synthetic resin stoving lacquers, or in synthetic resins, such as polyvinyl acetate and polyacrylates.

The coatings which are produced with such paints, or the synthetic resin coatings which contain the agents according to the invention, are protected for long periods of time against attacks by mould and bacteria. This is of special importance for coatings in moist rooms and for packing materials.

The sulphamides of the above formula are obtainable, for example, in that, according to French patent specification No. 1,310,083, sulphamides of the formula

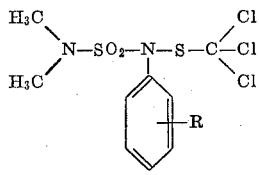

in which R has the above meaning, are reacted with anhydrous hydrofluoric acid, expediently at temperatures between 0 and 20° C., with the use of anhydrous hydrofluoric acid as solvent, or in that sulphamides of the formula

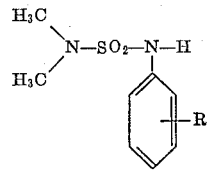

in which R has the above meaning, are reacted in an aqueous medium or in an inert organic solvent, such as benzene or carbon tetrachloride, at room temperature or at a moderately elevated temperature, with dichlorofluoromethanesulphenyl chloride in the presence of acid-binding agents, such as alkali metal hydroxides or tertiary amines.

The following examples serve to illustrate the invention without, however, limiting its scope.

Example 1

A dispersion paint which is pigmented with lithopone and rutile titanium dioxide and which contains kaolin and talc as extender and a plasticiser-free polyvinyl acetate dispersion as binder, is mixed with 1% N,N-dimethyl-N'-phenyl - N'-dichlorofluoromethyl-thiosulphamide, referred to the total solids content of the paint. Walls and the like are then painted with this paint in the usual manner. The coatings are not attacked by mould for several months, even at a high atmospheric humidity.

The same protective effect is achieved when 1% N,N-dimethyl - N'-(o-chlorophenyl)-N'-dichlorofluoromethyl-thiosulphamide is added to the dispersion paint, instead of 1% N,N - dimethyl - N'-phenyl-N'-dichlorofluoromethyl-thiosulphamide.

Example 2

A stoving lacquer of melamine-alkyd resin pigmented with rutile titanium dioxide is mixed with 1.2% N,N-dimethyl - N' - p - tolyl-N'-dichlorofluoromethyl-thiosulphamide, referred to the solids content of the lacquer, and used in known manner for the preparation of coatings, the coatings being stoved at 130° C. for 20 minutes. The lacquer films thus obtained are not attacked by fungi for several months, even in tropical climates.

The following table shows that the sulphamides to be used according to the invention are superior to the microbicidal agents hitherto used for coatings in that they have a surprisingly higher activity. The stated concentrations of active compounds, referred to the total solids content of the coatings, are the minimum concentrations which prevent the coatings from being attacked by fungi.

| | Polyvinyl acetate dispersion paint, percent | Air-drying alkyd resin lacquer, percent | Melamine-alkyd resin stoving lacquer, percent |
|---|---|---|---|
| ![structure] | 2–2.5 | 1.7 | 1.5–2.0 |
| ![structure] | 3 | (¹) | (²) |
| ![structure] | 0.75–1 | 1.2–1.3 | 1–1.3 |

¹ Not drying.
² Film chalks.

The minimum concentrations were determined in such a manner that sections of solid cardboard were provided with coats which contained graduated amounts of the active compounds to be tested. The test pieces were kept in running water at 30° C. for 24 hours and then placed on dextrose-agar. The test pieces and the agar were then inoculated with a suspension which contained spores of the following mould fungi: *Aspergillus niger, Pullularia pullulans, Alternaria species, Stachybotrys atra Corda, Aspergillus flavus, Aspergillus ustus, Paecilomyces varioti, Cladesporium herbarum* and *Penicillium citrinum*. The test pieces were subsequently stored in an incubator at 20–30° C. for 3–4 weeks. The amount at which the test piece remained completely free from fungus growth was taken as the minimum concentration in each case.

We claim:
1. A coating composition comprising a member selected from the group consisting of dispersion paint, air drying oil lacquer, synthetic resin stoving lacquer, polyvinyl acetate and polyacrylate susceptible to attack by mold and containing an active amount of a compound of the formula

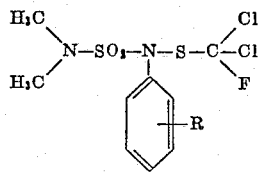

in which R is a member selected from the group consisting of hydrogen, methyl and chloro.

2. A composition according to claim 1 wherein the active ingredient is N,N-dimethyl-N'-phenyl-N'-dichlorofluoromethyl-thiosulphamide.

3. A composition according to claim 1 wherein the active ingredient is N,N-dimethyl-N'-(o-chlorophenyl)-N'-dichlorofluoromethyl-thiosulphamide.

4. A composition according to claim 1 wherein the active ingredient is N,N-dimethyl-N'-p-tolyl-N'-dichlorofluoromethyl-thiosulphamide.

References Cited

UNITED STATES PATENTS

| | | | |
|---|---|---|---|
| 2,779,941 | 1/1957 | Gysin et al. | 167—30 |
| 2,779,788 | 1/1957 | Gysin et al. | 167—30 |
| 2,911,439 | 11/1959 | Meikle | 167—30 |
| 3,154,518 | 10/1964 | Gradsten et al. | 260—45.9 |
| 3,150,110 | 8/1964 | Becker et al. | 260—17 |
| 3,251,850 | 5/1966 | Kuhle et al. | 167—30 |

FOREIGN PATENTS 1,310,083 France.

DONALD E. CZAJA, *Primary Examiner.*

H. E. TAYLOR, *Examiner.*